Patented Feb. 17, 1931

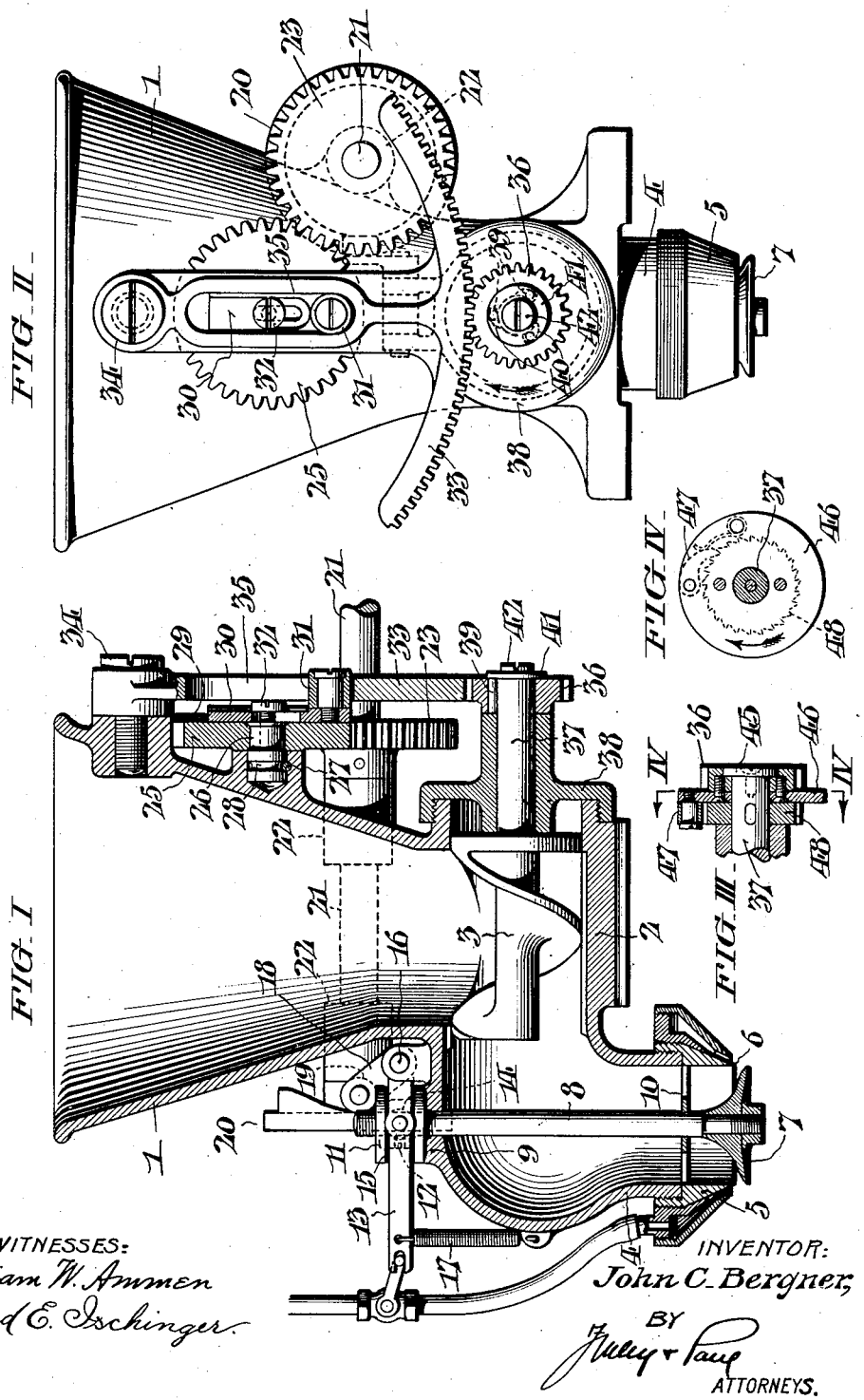

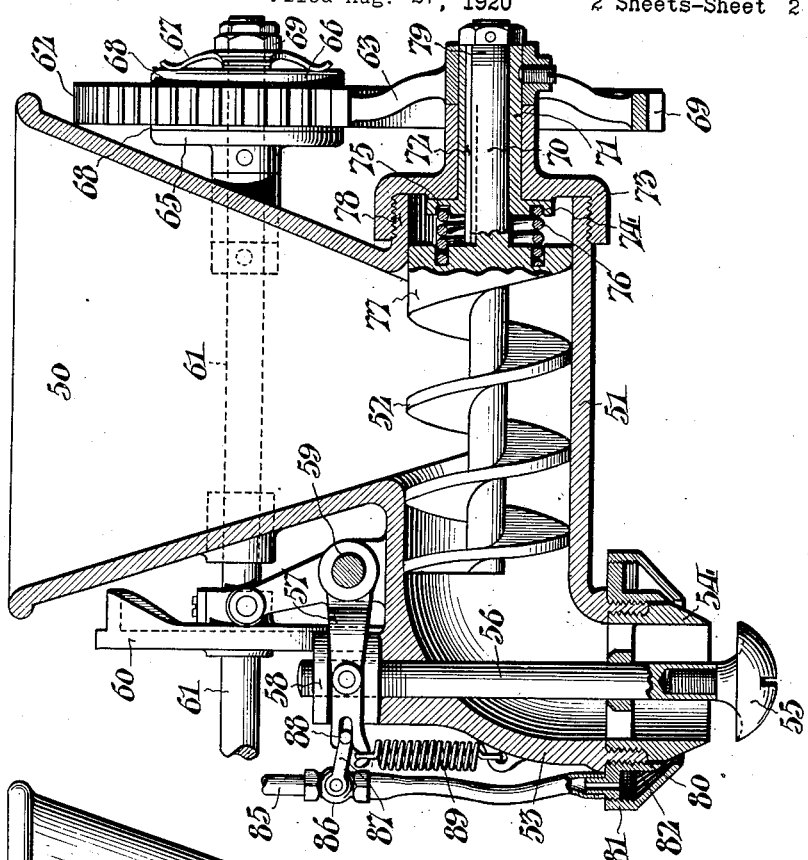

1,793,207

UNITED STATES PATENT OFFICE

JOHN C. BERGNER, OF PHILADELPHIA, PENNSYLVANIA, ASSIGNOR TO DOUGHNUT MACHINE CORPORATION, A CORPORATION OF NEW YORK

DEVICE FOR FORMING PASTRIES AND THE LIKE

Application filed August 27, 1920. Serial No. 406,381.

The invention relates to machines more especially useful to bakers and confectioners in forming pastries or similar products, which may be made of substances or mixtures sufficiently plastic to be capable of being forced through appropriate shaping dies. The invention is very advantageously applicable to the production of crullers or doughnuts of annular form.

Important advantages obtainable by my invention are cheapness of manufacture;—simplicity of construction;—continuity of operation;—production of perfect formations;—precision of severance to the exclusion of any possibility of distortion;—and capacity for regulation whereby the sizes of the formations may be varied as desired.

The invention lends itself readily to embodiment in several different forms which will be taken up separately in the detailed description which follows.

In the accompanying drawings, Fig. I, is a longitudinal sectional view through a forming device conveniently embodying my invention.

Fig. II, is an end elevation of the structure as seen from the right of Fig. I, certain parts being omitted.

Figs. III and IV, are detail views of an alternative form of mechanism whereby I am enabled to secure intermittent operation of the feeding means.

Fig. V, is a cross sectional view similar to Fig. I, of a modified form of my invention; and Fig VI, is an end elevation taken from the left of Fig. V.

Referring first to the form of my invention illustrated in Figs. I and II, 1 designates the supply hopper which communicates with, and is preferably formed as an integral part of a horizontal cylindrical casing 2. Within the casing is housed a feeding device, shown in the present instance, in the form of an auger 3, by which the material supplied from the hopper is fed forward and into a downwardly turned outlet 4 of the casing. Threaded to said outlet is a removable annular die element 5, having the cross sectional configuration clearly illustrated in Fig. I, from which it will be noted that the lower edge of this die element is beveled at a comparatively sharp angle to afford a circular cutting edge 6.

Co-operating with the die element 5, is a plunger cutter disc 7, which is axially movable with respect to the die element and normally spaced therefrom to provide an annular opening though which dough or similar plastic substance may be extruded to produce formations of corresponding configuration. In its upward movement, it is desirable that the disc 7, enters to a slight extent within the die element 5, so that clean and positive severance of the extrusion may be assured. The disc 7, is removably secured to the lower end of an actuating stem 8 which is axially shiftable under support and guidance of spaced bearings 9 and 10, the former of which is in the form of an integral boss projecting from the casing 2, and the latter, a web extending across the outlet 4. Both the die element 5, and the cutter disc 7, being removable similar co-operative elements of different sizes and shapes may be readily substituted when so desired. The downward motion of the disc 7 is limited by engagement of a collar 11 on the upper end of the stem 8, with the face of the bearing-boss 9. Said collar is threaded on the stem, and accordingly relative adjustment can be made to vary the spacing of the disc 7 with respect to the die element 5 to predetermine the thickness of extrusion through the die opening. Displacement of the collar after the desired adjustment has been secured, is prevented by a set screw shown at 12, in Fig. I. The stem 8 is actuated by an arm 13 upon which is mounted a roller 14 adapted to engage within a peripheral groove 15 of the collar 11. The arm 13 is secured to a rock shaft 16 journalled in suitable bearing lugs projecting from the casing 2. The cutter disc 7 is normally maintained in the lowered position illustrated in the drawings, by means of a helical tension spring 17 spanned between a fixed anchorage lug on the outlet extension 4, and the arm 13. The shaft 16 is rocked by an arm 18, which carries at its outer end, a roller 19, adapted for co-operation with a rotary cam disc 20. This disc is fixed upon a driving shaft 21 journalled in suitable bearing lugs 22, 22, projecting from the hopper 1, and which may be either hand or power actuated as desired. The cam projection on the disc 20 is of comparatively short extent and has an abrupt terminal drop, so that the movement induced in the cutter disc 7,—once for each rotation of the driving shaft 21,—is practically instantaneous, and ends (owing to the action of the spring 17) with a snap or jar that tends to quick doffing of the formations.

From Fig. I, it will be seen that the active (up) stroke of the cutter disc is in a direction opposite to that of the flow through the die outlet. Therefore, in order to avoid undue back pressure, I prefer to provide for the suspension of the activity of the feeding means during the cutting periods, and this is accomplished in the present instance, by actuating the auger intermittently and in alternation with the cutter disc. Mechanism by which such actuation can be effected may be briefly described as follows:

Near its right hand end (Fig. I) the shaft 21, carries a gear 23 which imparts rotation at a corresponding speed rate to an intermeshing idler gear 25. The latter gear has fixedly secured to it an axis or trunnion stud 26 which has bearing in a boss formed on the hopper 1 as clearly shown in Fig. I. Axial displacement of the stud is prevented by a pin 27 which engages within a peripheral depression 28 on said stud. The face of the gear 25 is diametrally grooved as indicated at 29, to receive and retain an adjustable slide plate 30, carrying at one end a roller 31, which may be set in any position by means of a screw 32, threaded into the stud 26. The roller 31, it will be noted, serves in effect as a crank, and causes oscillation of a gear sector 33 which is fulcrumed at 34, and whose arm is slotted as indicated at 35 for co-operation with said roller. The gear sector 33 meshes with a pinion 36 on the outer end of the shaft 37 of the feed auger 3, said shaft being journalled in a bearing formed on a cap piece 38 which is threaded to, and serves as a closure for the right hand extremity of the casing 2, as clearly shown in Fig. I. The mounting of the pinion 36 upon the shaft 37 is such that it is operative as a drive for the auger only when rotating in the direction of the arrow shown in Fig. II. The means by which selective rotation is effected includes, in the present instance, a number of roller pins 39 located within cam notches 40 suitably formed in the hub of the pinion 36, and retained by means of a washer 41 secured to the end of the shaft by a screw 42. Thus as the pinion is driven in the direction indicated, the roller pins 39 are wedged within the cam notches 40 and serve to bind the pinion to the shaft, but when rotation takes place in the opposite direction, release is automatically effected and the pins simply roll idly in the cam notches as a consequence of which the auger remains inactive.

By provision for the adjustment of the throw of the sector 33, as above set forth, the extent of rotation of the auger may be so controlled as to vary the quantity of dough extruded for each actuation, and by compensative adjustment of the disc 7 with respect to the die element 5 as previously described, the size of the formations discharged by the device may be amply varied to meet all commercial requirements.

An alternative means by which intermittent action of the auger 3, may be produced is shown in Figs. III and IV, wherein it will be noted that the drive pinion 36 is freely mounted upon the end of the shaft 37, and retained by a washer 45. To the pinion 36 is secured, a disc 46 which carries a spring pressed pawl 47 adapted to engage a ratchet wheel 48, fixed to the shaft. Thus motion in the direction of the arrow shown in Fig. IV, will cause the pawl to engage the ratchet wheel 48 and drive the shaft, while motion in the opposite direction will cause said pawl to slide idly over the ratchet teeth with the result that the auger will remain idle as in the previously described embodiment.

Referring now to the form and embodiment of my invention shown in Figs. V and VI, the hopper is here indicated at 50, and has the same functions as previously described. Also as in the previous form, said hopper communicates with an integral horizontal cylindrical casing 51 in which operates a feed auger 52. Said casing has a downwardly turned outlet 53, to the lower end of which is removably secured a die element 54. With said die element co-operates a plunger cutter disc 55, having the same general characteristics as the corresponding element in the first described form. The disc 55 is secured to the stem 56, which is actuated by an arm 57 having engagement at its outer end with the collar 58 at the top of said stem. The arm 57 is secured to a rock shaft 59 whose actuation is in turn effected by a rotary cam 60 secured to a drive shaft 61. Said shaft carries a gear 62 which drives the auger through an intermeshing gear 63; and thus the auger 52 and the cutter 55 are actuated in common (from the drive shaft 61), just as the auger 3 and the cutter 7 are in Figs. I–IV. The gear 62 is not directly attached to the driving shaft 61, but is interposed between a fixed disc 65 thereon bearing against one side of the gear, and a loose disc 66 bearing against the opposite side of said gear under pressure of a disc spring 67. Suitable friction gaskets 68, 68, of any approved material may be incorporated in the structure to increase the efficiency of contact with the gear. Pressure between these elements may be adjusted by a nut 69 which is threaded upon the end of the shaft 61, and directly operative upon the disc spring 67. The flexibility of the drive afforded by the construction just described will permit the auger to yield and remain inactive when influenced by back pressure during the operation of the cutter disc, and also affords protection against breakage in the event of accidental introduction into the hopper of an unyielding or solid substance.

As an additional provision for compensating for back pressure during the operation of the cutter, the auger is so mounted as to be capable of automatically shifting axially, as will now be explained.

The shaft 70, of the auger, is disposed within a sleeve 71 having a splined connection with said shaft as indicated at 72, and journalled in a cap piece 73. To the driving sleeve 71 is fixed the gear 63 already described, and its inner end is flanged to form a disc 74, whose face is recessed or grooved as at 75 to afford a seat for a helical compression spring 76. The opposite end of said spring is received in a similar annular recess in the face of the head 77, of the auger 52, which lies within the extension 78 of the casing 51. In order that the tension of the spring may be varied, the outer end of the shaft 70 is threaded as indicated at 79 to take a nut, which bears against the end of the sleeve 71. By virtue of this arrangement, the auger may automatically yield and shift axially against the spring 76 for the purpose noted. Thus the auger 52 is not only rotatably yielding to excessive pressure of the plastic material, but is also axially yielding to such pressure.

Associated with this form of my invention, I have shown supplemental means for assuring the doffing of the severed formations despite any tendency to adhere to the cutting elements. This device is in the form of a hollow annulus comprising constituent members 80 and 81, the former being directly attached to the outlet preferably by threaded engagement as indicated at 82. The member 81 is made adjustable with respect to the member 80 by a screw connection, so as to permit regulation of the annular outlet space between the lower edge of the member 80 and the sloping wall of the companion member. This slope tends to direct inwardly against the die element 54 a fluid medium,—such as compressed air or a liquid lubricant,—which may be supplied to the device by means of a tube connection 85. When the structure is employed, in the formation of doughnuts, discharge of hot grease from the circumjacent annular diffusing outlet of the doffing device, will serve to keep the die member heated and at the same time lubricated to prevent adhesion of the dough after the cutting is effected and thus facilitate prompt doffing. The discharge of the fluid from the device may be either continuous or intermittent as desired. For the latter method of operation, a valve 86 may be interposed in the supply tube (Fig. V), and its operating lever 87 connected, for example, to the cutter actuating arm 57 by a pin and slot connection, such as indicated at 88. Thus as the cutter element moves upwardly to effect cutting the valve is opened, and the fluid medium, as a result, permitted to impinge against the formation extruded from the die opening to effect positive doffing and release in a horizontal position.

This doffing device may, as shown, be employed with similar advantages, in connection with the first described form of my invention. In some instances, the supplemental doffing device may be dispensed with altogether, since the sudden jar upon the cutter element under the force of the spring 89 when released by the can 60, may be relied upon to effect doffing without additional aid.

It is to be particularly noted that in both forms of my invention as herein disclosed, the operation of the cutting disc is in opposition to the flow of extrusion through the die outlet, and the two types are similar in that the feeding auger in each case has capacity for remaining inactive during the operation of the cutter.

Having thus described my invention, I claim:

1. A forming device of the character described comprising a hopper with a normally open forming die outlet, a cooperating cutter having cutting movement contrary to flow through the outlet, feeding means for normally effecting extrusion through said outlet, and common actuating means for said cutter and said feeding means permitting the feeding means to remain quiescent during operation of the cutter.

2. A forming device of the character described comprising a hopper with a normally open forming die outlet, a cooperating cutter having cutting movement contrary to flow of material through the outlet, feeding means for normally effecting extrusion through said outlet, and common actuating means for said cutter and said feeding means with provisions enabling the feeding means to yield to enforced inactivity under excessive pressure of the material during operation of the cutter.

3. A forming device of the character described comprising a hopper with a normally open forming die outlet, a cooperating cutter having cutting movement contrary to flow of material through the outlet, feeding means for normally effecting extrusion through said outlet, and common actuating means for said cutter and said feeding means permitting lost motion of said feeding means, under excessive pressure of the material, during operation of the cutter.

4. In a device of the character described, the combination of a hopper with a normally open forming die outlet; rotary feeding means for effecting extrusion through the die outlet; a cutter movable into the die outlet from without to sever extrusions; and direct coordinating connections for actuating said feeding means and said cutter in alternation.

5. In a device of the character described, the combination of a hopper with a normally open forming die outlet; rotary feeding means for effecting extrusion through the die outlet; a cutter movable into the die outlet from without to sever extrusions; direct coordinating connections for actuating said feeding means and cutter in alternation; and associated means whereby the extent of actuation of the feeding means may be regulated to vary the quantity extruded.

6. In a device of the character described, the combination of a hopper having a forming die outlet; a cutter co-operating with said die outlet; an auger for effecting extrusion through the die outlet; and mechanism for intermittently rotating said auger, including a crank, an oscillating gear sector operatively co-ordinated with said crank and adapted to actuate a pinion mounted upon the axis of the auger, and means for clutching the pinion to the auger axis to effect driving in one direction only.

7. In a device of the character described, the combination of a hopper having a forming die outlet; a cutter co-operating with said die outlet; an auger for effecting extrusion through the die outlet; and means for intermittently rotating said auger, including a crank, an oscillating gear sector operatively co-ordinated with said crank and adapted to actuate a pinion mounted upon the axis of the auger, and means for varying the extent of oscillation of the sector.

In testimony whereof, I have hereunto signed my name at Philadelphia, Pennsylvania, this 25th day of August, 1920.

JOHN C. BERGNER.